Patented June 9, 1931

1,809,798

UNITED STATES PATENT OFFICE

ALBERT M. CLIFFORD, OF AKRON, OHIO, ASSIGNOR TO THE GOODYEAR TIRE & RUBBER COMPANY, OF AKRON, OHIO, A CORPORATION OF OHIO

ANTIOXIDANT OR AGE-RESISTER

No Drawing. Original application filed April 7, 1928, Serial No. 268,387. Divided and this application filed March 8, 1929. Serial No. 345,607.

This invention relates to the treatment of rubber and it has particular relation to a method of treatment whereby the durability of rubber compounds is materially enhanced.

This application is a division of application Serial No. 268,387, filed April 7, 1928.

One object of the invention is to provide an antioxidant or age-retarder for rubber compounds that may be incorporated into the rubber with minimum expenditure of time and effort.

Another object of the invention is to provide a material of the above designated character, which is substantially non-odorous and non-toxic.

Heretofore, it has been observed that certain compounds, when incorporated into rubber, materially reduce the rate of deterioration caused by the action of light and air upon the rubber. These compounds, therefore, act as preservatives, greatly increasing the life of the rubber into which they are incorporated. The compounds, although they act as preservatives, have little or no effect as accelerators of vulcanization. They may be incorporated into most standard rubber compounds prior to vulcanization without appreciably disturbing the so-called "balance" of the formula. Although many substances have been proposed for this purpose (for example, hydroquinone, para nitroso amino phenol, resorcinol, etc.), most of the materials thus far tested have not proved to be satisfactory in all respects. Some substances, while fairly efficient as antioxidants, are highly toxic and their utilization frequently results in poisoning of the workmen employed in handling the rubber. Other materials are difficult to distribute uniformly through the rubber. Still other materials of this class, while they may be reasonably satisfactory in other respects, are unduly expensive to manufacture, and their general use is consequently impractical.

This invention consists in the discovery that the sulfur reaction products of certain amines of the type:

in which R and $R_1$ represent hydrocarbon radicals, particularly aryl radicals, are excellent antioxidants, substantially free from most of the objectionable features heretofore encountered with regard to most of the antioxidants heretofore employed. One specific example of a compound of this class is thio diphenylamine, which has the following structural formula:

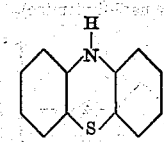

This material may be prepared by heating sulfur and diphenylamine together in an autoclave at a relatively high temperature and pressure. However, a better method for the preparation of the compound consists in heating a mixture of diphenylamine and sulfur together in the presence of a trace of iodine. Preferably, the iodine should equal approximately ½ percent by weight of the amine employed. The reaction temperature may vary somewhat, but for best results should range from 180° to 190° C. In any event, the mixture should be heated until one mol of hydrogen sulphide is evolved.

The evolution of a mol of hydrogen sulphide usually requires ten to fifteen minutes. At the end of that time, the reaction product may be permitted to cool. The cooled product sets into a hard mass or cake, which may be pulverized and employed as an antioxidant without further purification, although for best results it is preferable to purify the mass by dissolving it in a convenient solvent; for example, alcohol, and then pouring the solution into water. The reaction product of the sulfur and the amine, being insoluble in water, is precipitated as a fine powder-like material, which may be removed from the liquid by filtration. The yields obtained by this method are substantially quantitative. The purified product has a definite melting point of 180° C., and is soluble in alcohol, benzene and ether. The reaction taking place during the course of preparation of the material may be represented as follows:

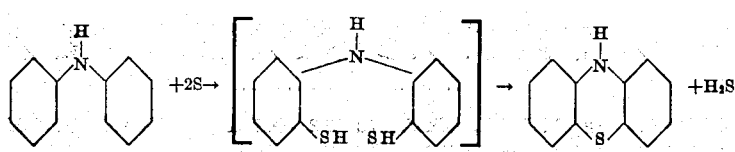

The method outlined for the preparation of thio diphenylamine is equally applicable to the preparation of a relatively large number of compounds of this class. For example, it may be employed in the preparation of such materials as thio phenyl-beta-naphthylamine, melting point 178° C., thio-beta-dinaphthylamine, melting point about 280° C., and thio phenyl-alpha-napthylamine, melting point 130½° C. The reactions taking place in the preparation of the latter substances may, respectively, be represented by the following structural formulæ:

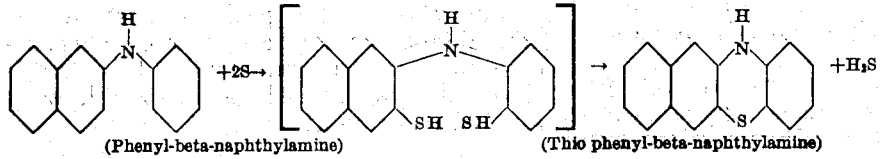
(Phenyl-beta-naphthylamine)    (Thio phenyl-beta-naphthylamine)

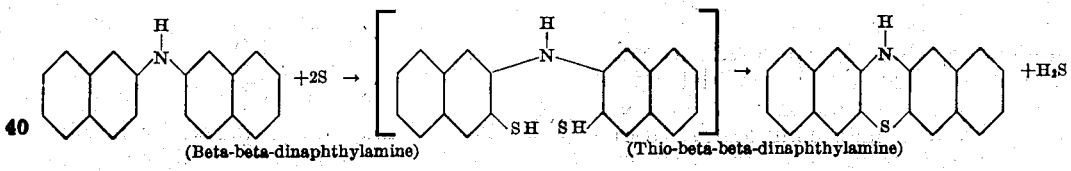
(Beta-beta-dinaphthylamine)    (Thio-beta-beta-dinaphthylamine)

All of these substances may be employed in most of the standard rubber compounds with very satisfactory results. The following is a specific example of a compound that yields an excellent product when any of the materials just discussed are employed as antioxidants.

| | Parts |
|---|---|
| Extracted rubber | 100 |
| Zinc oxide | 5 |
| Sulfur | 4 |
| Stearic acid | 1.5 |
| Hexamethylene tetramine | 1 |
| Antioxidant | 1 |

Samples of material prepared in accordance with the preceding formula were vulcanized and one set of samples was then subjected to physical tests to ascertain their tensile strength and elasticity before aging. Similar samples were also subjected to a six-day period of artificial aging in an oxygen bomb at a temperature of 50° C. and under an oxygen pressure of 150 pounds per square inch. These samples were weighed both before and after aging, in order to ascertain the percent increase in weight, due to the absorption of oxygen. They were then subjected to physical tests similar to those conducted upon the unaged samples. The results of these tests are indicated in the following tables.

*Thio diphenylamine before aging*

| Time of cure in mins. | Steam pressure—lbs. per sq. in. | Load in kgs/cm² at | | | Per cent elong. at break | Per cent weight increase |
|---|---|---|---|---|---|---|
| | | 500% elong. | 700% elong. | Break | | |
| 30 | 40 | 12 | 35 | 100 | 895 | |
| 50 | 40 | 18 | 37 | 150 | 845 | |
| 70 | 40 | 28 | 117 | 165 | 765 | |

*After aging*

| 30 | 40 | 15 | 52 | 95 | 810 | .19 |
| 50 | 40 | 25 | 91 | 135 | 770 | .15 |
| 70 | 40 | 36 | 141 | 150 | 710 | .53 |

*Thio phenyl-beta-naphthylamine before aging*

| 30 | 40 | 13 | 39 | 105 | 880 | |
| 50 | 40 | 23 | 83 | 155 | 810 | |
| 70 | 40 | 30 | 122 | 180 | 795 | |

*After aging*

| 30 | 40 | 17 | 59 | 125 | 830 | .09 |
| 50 | 40 | 28 | 108 | 165 | 775 | .07 |
| 70 | 40 | 40 | 156 | 170 | 710 | .28 |

*Thio-beta-beta-dinaphthylamine before aging*

| 30 | 40 | 17 | 54 | 120 | 855 | |
| 50 | 40 | 23 | 85 | 170 | 820 | |
| 70 | 40 | 34 | 135 | 185 | 760 | |

*After aging*

| 30 | 40 | 20 | 69 | 120 | 800 | .07 |
| 50 | 40 | 30 | 115 | 150 | 745 | .22 |
| 70 | 40 | 42 | 158 | 165 | 710 | .49 |

From the tables it will be apparent that the thio amines discussed are highly efficient antioxidants, and that the compounds into which they were incorporated resisted the action of oxygen in a highly satisfactory manner even under the relatively severe conditions to which they were subjected during the test. Under similar conditions, samples containing no antioxidant are reduced to resinous masses practically devoid of tensile strength and elasticity.

These materials are substantially non-odorous, non-toxic, and may readily be reduced to impalpable powders that may be intermixed with the rubber with greatest ease. The compounds may also be easily prepared from relatively inexpensive materials. It is evident, therefore, that they are in all respects highly satisfactory as antioxidants.

Although I have described in detail only the preferred embodiments of the invention, it will be apparent to those skilled in the art that the invention is not so limited, but that various minor modifications may be made therein without departing from the spirit of the invention or from the scope of the appended claims.

What I claim is:

1. A method of preserving rubber which comprises incorporating therein the reaction product of beta-beta-dinaphthylamine and sulphur, said product having been formed with the elimination of hydrogen sulphide.

2. A rubber product that has been vulcanized in the presence of thio beta-beta-dinaphthylamine.

3. A method of preserving rubber which comprises subjecting it to vulcanization in the presence of a material having the formula

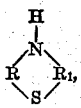

in which R and $R_1$ are naphthylene groups.

4. A method of preserving rubber which comprises subjecting it to vulcanization in the presence of a reaction product of dinaphthylamine and sulphur.

5. A rubber product that has been vulcanized in the presence of a reaction product of a dinaphthyl substituted amine, with sulphur.

6. A rubber product that has been vulcanized in the presence of thio di-beta-beta-dinaphthylamine.

In witness whereof, I have hereunto signed my name.

Signed at Akron, in the county of Summit and State of Ohio, U. S. A., this 7th day of March, 1929.

ALBERT M. CLIFFORD.